US012581457B2

(12) United States Patent
Shi

(10) Patent No.: US 12,581,457 B2
(45) Date of Patent: Mar. 17, 2026

(54) PAGING MESSAGE MONITORING METHOD, PAGING MESSAGE MONITORING APPARATUS, AND STORAGE MEDIUM

(71) Applicant: Beijing Xiaomi Mobile Software Co., Ltd., Beijing (CN)

(72) Inventor: Rao Shi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 334 days.

(21) Appl. No.: 18/267,358

(22) PCT Filed: Dec. 15, 2020

(86) PCT No.: PCT/CN2020/136601
§ 371 (c)(1),
(2) Date: Jun. 14, 2023

(87) PCT Pub. No.: WO2022/126391
PCT Pub. Date: Jun. 23, 2022

(65) Prior Publication Data
US 2024/0049177 A1 Feb. 8, 2024

(51) Int. Cl.
*H04W 68/02* (2009.01)
*H04W 52/02* (2009.01)
(52) U.S. Cl.
CPC ....... *H04W 68/02* (2013.01); *H04W 52/0216* (2013.01)

(58) Field of Classification Search
CPC ............. H04W 68/02; H04W 52/0216; H04W 68/005; H04W 4/16; H04W 76/28; Y02D 30/70
See application file for complete search history.

(56) References Cited

U.S. PATENT DOCUMENTS

| | | | | |
|---|---|---|---|---|
| 2012/0122495 | A1* | 5/2012 | Weng .................. | H04W 68/025 |
| | | | | 455/458 |
| 2018/0110029 | A1* | 4/2018 | Kim ...................... | H04W 68/12 |
| 2019/0313364 | A1* | 10/2019 | Liang .................... | H04W 76/25 |
| 2020/0344719 | A1 | 10/2020 | Luo et al. | |

(Continued)

FOREIGN PATENT DOCUMENTS

| | | | |
|---|---|---|---|
| CN | 108024221 | A | 5/2018 |
| CN | 108668359 | A | 10/2018 |

(Continued)

OTHER PUBLICATIONS

Ericsson, "Indication of CN initiated or RAN initiated paging", 3GPP TSG-RAN WG2 #102, Tdoc R2-1806807, Busan, Republic of Korea, May 21-25, 2018.

(Continued)

*Primary Examiner* — Charles T Shedrick
(74) *Attorney, Agent, or Firm* — Volpe Koenig

(57) ABSTRACT
A paging message monitoring method, computer readable medium and apparatus that reduce power consumption in a wireless network. The power consumption is reduced by: determining a paging message type, the paging message type including at least one of a Core Network (CN) paging message type, a Radio Access Network (RAN) paging message type, or a paging short message type; and monitoring a paging message based on the paging message type.

18 Claims, 6 Drawing Sheets

(56) References Cited

U.S. PATENT DOCUMENTS

| | | | | |
|---|---|---|---|---|
| 2023/0300789 A1* | 9/2023 | Hwang | | H04W 68/005 |
| | | | | 370/329 |
| 2023/0397158 A1* | 12/2023 | Hossain | | H04W 68/005 |
| 2024/0284456 A1* | 8/2024 | Elkotby | | H04W 76/19 |
| 2024/0381317 A1* | 11/2024 | Hwang | | H04W 52/0216 |
| 2025/0225146 A1* | 7/2025 | Rossi | | G06F 16/283 |

FOREIGN PATENT DOCUMENTS

| | | | |
|---|---|---|---|
| CN | 109923913 A | 6/2019 |
| CN | 111356230 A | 6/2020 |
| WO | 2018084761 A1 | 5/2018 |
| WO | 2018176372 A1 | 10/2018 |
| WO | 2020/216242 A1 | 10/2020 |

OTHER PUBLICATIONS

Samsung, "Paging Enhancements to Reduce False Alarms",3GPP TSG-RAN2 Meeting #112 Electronic,R2-2009092, Nov. 2-Nov. 13, 2020.

Huawei, HiSilicon, "Paging enhancement(s) for UE power saving in IDLE/inactive mode" 3GPP TSG RAN WG1 Meeting R1-2007600(Nov. 13, 2020).

Ericsson, "Paging in Light Connection" 3GPP TSG RAN WG1 Meeting #95Bis Tdoc R2-166950 (Oct. 14, 2016).

* cited by examiner

Network device

Terminal        Terminal

Determine the paging message type    S11

Monitor the paging message based at least on  the paging message type    S12

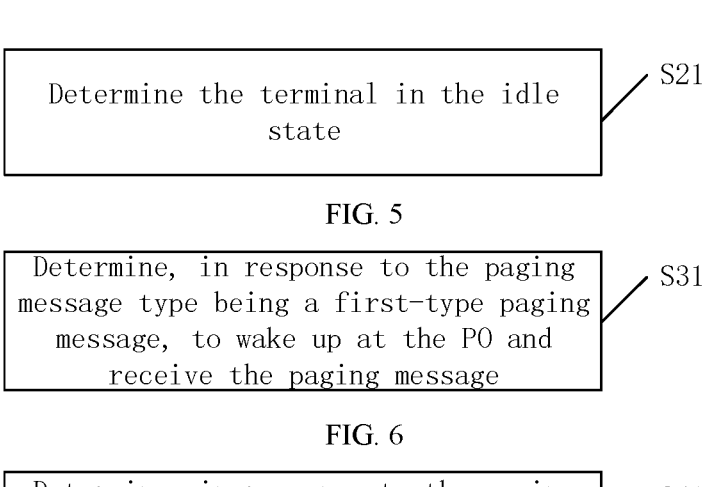

Determine the terminal in the idle
state    S21

FIG. 5

Determine, in response to the paging
message type being a first-type paging
message, to wake up at the PO and
receive the paging message    S31

FIG. 6

Determine, in response to the paging
message type being a second-type
paging message, to enter the sleep
state at the PO    S41

FIG. 7

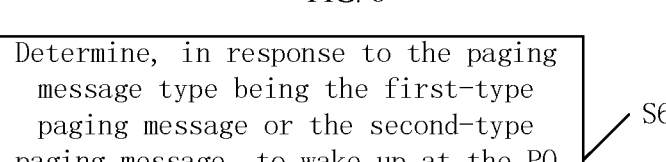

Determine the terminal in the
inactive state    S51

FIG. 8

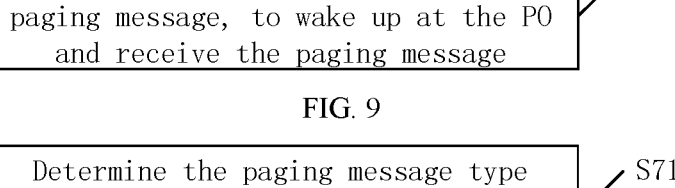

Determine, in response to the paging
message type being the first-type
paging message or the second-type
paging message, to wake up at the PO
and receive the paging message    S61

FIG. 9

Determine the paging message type
based on Paging Early Indication
(PEI) information    S71

FIG. 10

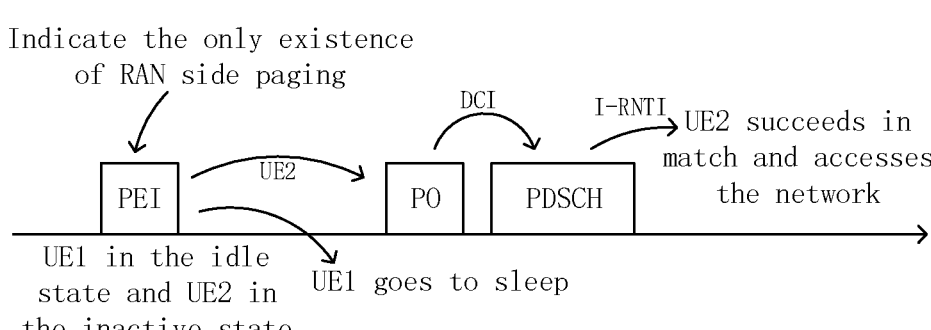

Indicate the only existence
of RAN side paging

DCI

I-RNTI

UE2 succeeds in
match and accesses
the network

PEI

UE2

PO

PDSCH

UE1 in the idle
state and UE2 in
the inactive state

UE1 goes to sleep

FIG. 11

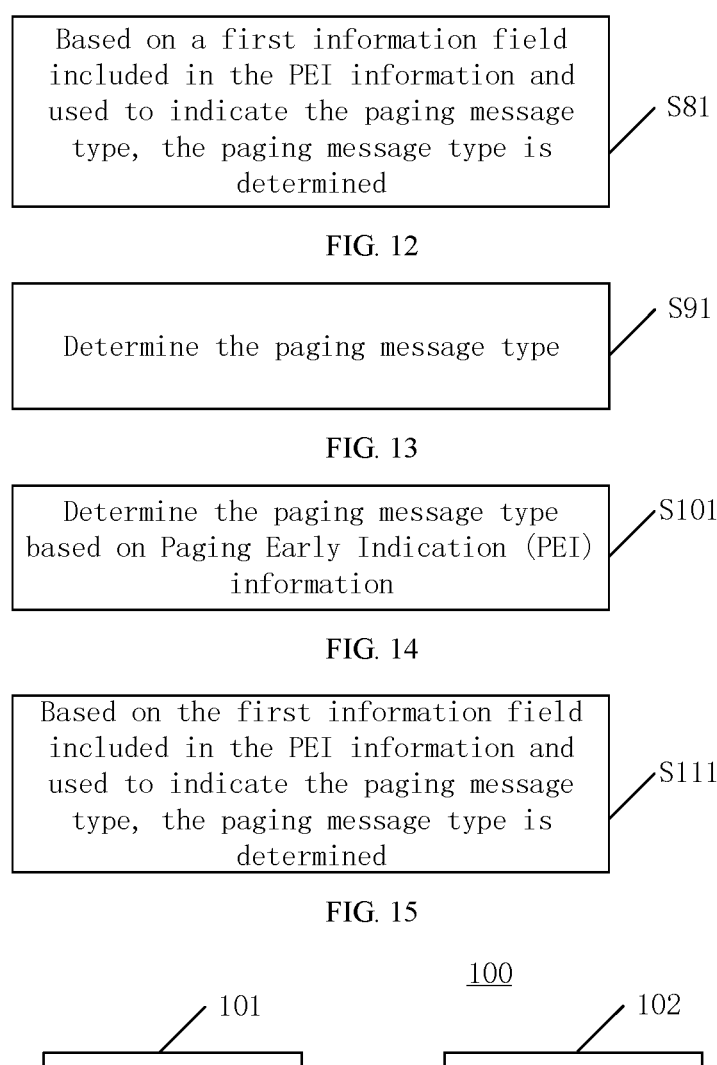

Based on a first information field included in the PEI information and used to indicate the paging message type, the paging message type is determined — S81

FIG. 12

Determine the paging message type — S91

FIG. 13

Determine the paging message type based on Paging Early Indication (PEI) information — S101

FIG. 14

Based on the first information field included in the PEI information and used to indicate the paging message type, the paging message type is determined — S111

Determining module — 101

Monitoring module — 102

Determining module — 201

FIG. 17

PAGING MESSAGE MONITORING METHOD, PAGING MESSAGE MONITORING APPARATUS, AND STORAGE MEDIUM

CROSS REFERENCE TO RELATED APPLICATION

The present application is a U.S. National Stage of International Application No. PCT/CN2020/136601, filed on Dec. 15, 2020, the contents of all of which are incorporated herein by reference in their entireties for all purposes.

BACKGROUND

A network may enable an idle state (RRC_IDLE) terminal and an inactive state (RRC_INACTIVE) terminal to initiate a Radio Resource Control (RRC) connection via paging, so as to restore the network to an RRC connected state. Paging is further divided into Core Network (CN) paging and Radio Access Network (RAN) paging. In order to reduce unnecessary monitoring performed by the terminal, a paging indication is further performed, which is used to instruct the terminal to acquire a paging message at a corresponding Paging Occasion (PO).

SUMMARY

According to a first aspect of examples of the present disclosure, a paging message monitoring method is provided. The method is performed by a terminal and includes: determining a paging message type, the paging message type including at least one of a CN paging message type, a RAN paging message type, or a paging short message type; and monitoring a paging message based on the paging message type.

According to a second aspect of the examples of the present disclosure, a paging message monitoring method is provided. The method is performed by a network device and includes: determining a paging message type, the paging message type including at least one of a CN paging message type, a RAN paging message type, or a paging short message type.

According to a third aspect of the examples of the present disclosure, a paging message monitoring apparatus is provided, including: a processor; and a memory used to store a processor executable instruction, where the processor is configured to execute the paging message monitoring method as described in the first aspect or in any implementation of the first aspect, or execute the paging message monitoring method as described in the second aspect or in any implementation of the second aspect.

According to a fourth aspect of the examples of the present disclosure, a non-transitory computer-readable storage medium is provided, and when an instruction in the storage medium is executed by a processor of a mobile terminal, the mobile terminal is enabled to execute the paging message monitoring method as described in the first aspect or in any implementation of the first aspect, or execute the paging message monitoring method as described in the second aspect or in any implementation of the second aspect.

It could be understood that the above general description and the following detailed description are only exemplary and explanatory, and cannot limit the present disclosure.

BRIEF DESCRIPTION OF THE DRAWINGS

The accompanying drawings, which are incorporated in and constitute a part of the specification, illustrate the examples consistent with the present disclosure and, together with the specification, serve to explain the principles of the present disclosure.

FIG. 5 is a flowchart of another paging message monitoring method, shown according to an example.

FIG. 6 is a flowchart of another paging message monitoring method, shown according to an example.

FIG. 7 is a flowchart of another paging message monitoring method, shown according to an example.

FIG. 8 is a flowchart of another paging message monitoring method, shown according to an example.

FIG. 9 is a flowchart of another paging message monitoring method, shown according to an example.

FIG. 10 is a flowchart of another paging message monitoring method, shown according to an example.

FIG. 11 is a schematic diagram of a paging message monitoring method, shown according to an example.

FIG. 12 is a flowchart of another paging message monitoring method, shown according to an example.

FIG. 13 is a flowchart of another paging message monitoring method, shown according to an example.

FIG. 14 is a flowchart of another paging message monitoring method, shown according to an example.

FIG. 15 is a flowchart of another paging message monitoring method, shown according to an example.

FIG. 16 is a block diagram of a paging message monitoring apparatus, shown according to an example.

FIG. 17 is a block diagram of another paging message monitoring apparatus, shown according to an example.

DETAILED DESCRIPTION

Examples will be described in detail here, and instances thereof are shown in the accompanying drawings. The following description refers to the accompanying drawings in which the same numbers in different figures represent the same or similar elements unless otherwise indicated. The implementations described in the following examples do not represent all implementations consistent with the present disclosure. Instead, they are merely examples of apparatuses and methods consistent with some aspects of the present disclosure described as detailed in the appended claims.

The present disclosure relates to the technical field of wireless communications, and particularly to a paging message monitoring method, a paging message monitoring apparatus, and a storage medium.

In a communication art, a network may send a paging message to an RRC_IDLE UE and an RRC_INACTIVE UE. For example, if the network has a downlink message or data that needs to be sent, the UE may initiate RRC connection establishment and recovery via paging, so that the UE can return to an RRC connected state. In addition, paging may also be used to notify UEs in all states covered by the network to receive a system message update through a paging short message, and to notify the UEs to receive an Earthquake and Tsunami Warning System message and a Commercial Mobile Alert System message through the paging short message.

In the related art, paging may be divided into CN paging and RAN paging, where the CN paging is initiated by a CN, carries a 5G-S-TMSI identifier, and is used to notify the IDLE_UE and the INACTIVE_UE in an abnormal state to access the network. The RAN paging is initiated by a RAN (e.g., a base station) side, carries an I-RNTI identifier, and is used to notify the INACTIVE_UE to access the network. Therefore, the IDLE_UE does not need to receive the paging message initiated by the RAN side. However, according to a relevant paging mechanism, the UE acquires a monitored PO according to the paging configuration of a system message or high-level signaling and a UE_ID. In other words, the IDLE_UE and the INACTIVE_UE may monitor the same PO at the same time. In the following examples, the present disclosure may describe the case where the IDLE_UE and the INACTIVE_UE monitor the same PO at the same time in conjunction with the drawings, taking the network only having RAN side paging, UE A representing the IDLE_UE, and UE B representing the INACTIVE_UE as an example.

Figure 1:
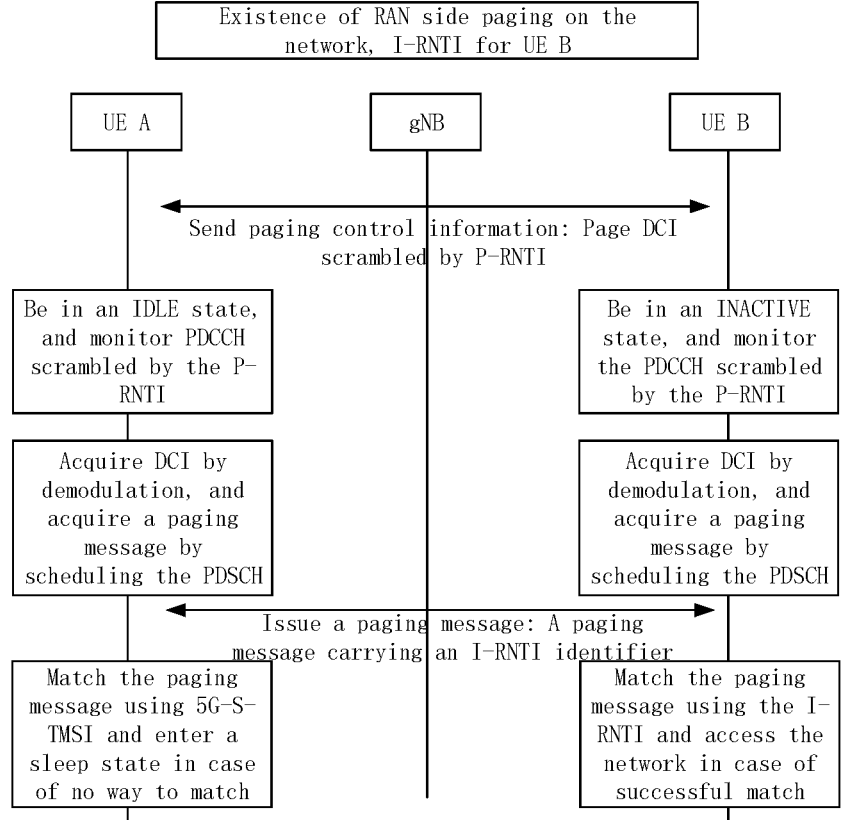
FIG. 1 is a schematic diagram of a paging reception mechanism shown in the present disclosure.

FIG. 1 is a schematic diagram of a paging reception mechanism shown in the present disclosure. As shown in FIG. 1, the network only has the RAN side paging and carries the I-RNTI identifier used to notify the UE B (i.e., the INACTIVE_UE) to access the network. The RAN side sends paging control information, where the paging control information is paging Downlink Control Information (DCI) scrambled by P-RNTI. However, both the IDLE_UE (i.e., the UE A) and the INACTIVE_UE may monitor the PO. In other words, the IDLE_UE starts to monitor PDCCH scrambled by the P-RNTI, and acquires the paging message by demodulating the paging DCI and scheduling PDSCH carrying the paging message. The INACTIVE_UE also starts to monitor the PDCCH scrambled by the P-RNTI, and acquires the paging message by demodulating the paging DCI and scheduling the PDSCH carrying the paging message. The IDLE_UE and the INACTIVE_UE simultaneously acquire the paging message sent by the RAN side. At this moment, the IDLE_UE uses the paging message carrying the 5G-S-TMSI identifier, so the IDLE_UE does not match the paging message carrying the I-RNTI identifier sent by the RAN side, and is determined to enter a sleep state. However, the INACTIVE_UE uses the paging message carrying the P-RNTI identifier, so the INACTIVE_UE matches the paging message sent by the RAN side and carrying the I-RNTI identifier, and determines to access the network.

Figures 2, 3, 4:
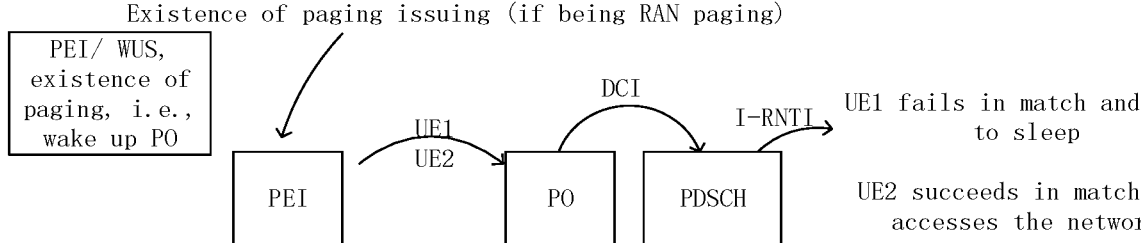
FIG. 2 is a schematic diagram of introducing PEI/Wake Up Signal (WUS) into a paging reception mechanism shown in the present disclosure.
FIG. 3 is an architectural diagram of a communication system between a network device and a terminal shown according to an example.
FIG. 4 is a flowchart of a paging message monitoring method, shown according to an example.

And, in the related art, in order to reduce unnecessary monitoring of the PO by the UE, a PEI/WUS is further introduced. The PEI/WUS is set before the PO to indicate whether there is a paging message in the network. In response to the existence of the paging message in the network, it is determined that indication information is sent based on the PEI/WUS, and the UE determines the monitored PO according to the indication information, and accordingly acquires the corresponding paging message. In response to the absence of the paging message in the network, the indication information is not sent, and then the UE determines that the PO does not need to be monitored, thus achieving the purpose of power saving. However, FIG. 2 is a schematic diagram of introducing the PEI/WUS into a paging reception mechanism shown in the present disclosure. As shown in FIG. 2, the UE in an idle state is represented by UE1, and the UE in an inactive state is represented by UE2. By the above method of introducing the PEI/WUS, the UE1 and the UE2 are enabled to determine the monitored PO. However, for the IDLE_UE (i.e., the UE1), if there is any paging message, the PEI/WUS indication information may be received, and the indicated PO is monitored, which may still cause the IDLE_UE, in case of the only existence of RAN paging, to perform unnecessary monitoring. In many instances, the INACTIVE_UE retains the context in the CN and may temporarily suspend its own bearer, and in general, the number of paging on the RAN side is much larger than the number of paging on the CN side. This also means that the IDLE_UE may receive a large number of unnecessary RAN side paging, wasting a large amount of power consumption.

Based thereon, the present disclosure provides a paging monitoring method, in which a paging message type identifier is added to the PEI/WUS indication information, and the UE may determine whether to monitor the corresponding PO according to the paging message type identifier, thus preventing the IDLE_UE from receiving unnecessary RAN side paging, and accordingly achieving the purpose of reducing the power consumption.

FIG. 3 is an architectural diagram of a communication system between a network device and a terminal, shown according to an example. The paging message monitoring method provided in the present disclosure may be performed by the architectural diagram of the communication system shown in FIG. 3. As shown in FIG. 3, the terminal receives the paging message sent by the network side.

It can be understood that the communication system between the network device and the terminal shown in FIG. 3 is only a schematic illustration, and a wireless communication system may also include other network devices. For example, the system may also include a CN device, a wireless relay device, a wireless backhaul device, etc., which are not shown in FIG. 1. The example of the present disclosure does not limit the number of network devices and the number of terminals included in the wireless communication system.

It can be further understood that the wireless communication system in the example of the present disclosure is a network that provides a wireless communication function. The wireless communication system may employ different communication arts, such as Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), Single Carrier FDMA (SC-FDMA), Carrier Sense Multiple Access with Collision Avoidance. According to the capacity, speed, delay, and other factors of different networks, the network may be divided into a 2G (English: generation) network, a 3G network, a 4G network, or a future evolution network, such as a 5G network, and the 5G network may also be called a New Radio (NR). For convenience of description, the present disclosure may sometimes refer to the wireless communication network simply as the network.

Further, the network device involved in the present disclosure may also be referred to as a RAN device. The RAN device may be: a base station, an evolved node B (base station), a home base station, an Access Point (AP) in a Wireless Fidelity (WIFI) system, a wireless relay node, a wireless backhaul node, a Transmission Point (TP) or a Transmission and Reception Point (TRP), etc., and may also be a gNB in an NR system, or may be a component or part of device constituting the base station, etc. When being an Internet of Vehicles (V2X) communication system, the network device may also be an on-board device. It should be understood that a specific technology and a specific device form adopted by the network device are not limited to the examples of the present disclosure.

Further, the terminal involved in the present disclosure may also be called a terminal device, a UE, a Mobile Station (MS), a Mobile Terminal (MT), etc., and is a device that provides voice and/or data connectivity to users. For example, the terminal may be a handheld device with a wireless connection function, or an on-board device, etc. At present, some examples of the terminal are: a Mobile Phone, a Pocket Personal Computer (PPC), a palm computer, a Personal Digital Assistant (PDA), a notebook computer, a tablet computer, a wearable device, or an on-board device, etc. In addition, when being the V2X communication system, the terminal device may also be the on-board device. It should be understood that the example of the present disclosure does not limit a specific technology and a specific device form that are adopted by the terminal.

FIG. 4 is a flowchart of a paging message monitoring method shown according to an example. As shown in FIG. 4, the paging message monitoring method is performed by the terminal and includes the following steps.

At S11, a paging message type is determined.

In the example of the present disclosure, the paging message type includes at least one of a CN paging message type, a RAN paging message type, or a paging short message type.

At S12, a paging message is monitored based at least on the paging message type.

In the example of the present disclosure, a UE determines to monitor a PO and receive the paging message according to the determined paging message type and the state of the UE itself. Herein, the state of the UE may be RRC_IDLE and RRC_INACTIVE.

FIG. 5 is a flowchart of a paging message monitoring method shown according to an example. As shown in FIG. 5, the paging message monitoring method is performed by the terminal and also includes the following steps.

At S21, the terminal is determined in an idle state.

In some examples of the present disclosure, the UE is determined in the RRC_IDLE, and the IDLE_UE determines the paging message type via an indication message.

FIG. 6 is a flowchart of a paging message monitoring method shown according to an example. As shown in FIG. 6, monitoring the paging message based on the paging message type includes the following steps.

At S31, in response to the paging message type being a first-type paging message, it is determined to wake up at the PO and receive the paging message.

In the example of the present disclosure, the IDLE_UE determines that the paging message type is the first-type paging message. Herein, the first-type paging message includes at least one paging message type, and the at least one paging message type includes at least one of the CN paging message type or the paging short message type. The IDLE_UE determines, in response to the paging message type being the first-type paging message, to wake up at the PO and receive the paging message.

In the example of the present disclosure, the first-type paging message may include one of the following: the CN paging message type; the paging short message type; the CN paging message type and the RAN paging message type; the CN paging message type and the paging short message type;

the paging short message type and the RAN paging message type; or the CN paging message type, the RAN paging message type and the paging short message type.

In an implementation, the first-type paging message may also be referred to as a paging information type for the IDLE_UE and/or the INACTIVE_UE.

FIG. 7 is a flowchart of a paging message monitoring method shown according to an example. As shown in FIG. 7, monitoring the paging message based on the paging message type includes the following steps.

At S41, in response to the paging message type being a second-type paging message, it is determined to enter a sleep state at the PO.

In the example of the present disclosure, the IDLE_UE determines that the paging message type is the second-type paging message. Herein, the second-type paging message includes a paging message type, and the paging message type is the RAN paging message type. The IDLE_UE determines, in response to the paging message type being the second-type paging message, to enter the sleep state at the PO.

In an implementation, the second-type paging message may also be referred to as a paging message type for the INACTIVE_UE.

FIG. 8 is a flowchart of a paging message monitoring method shown according to an example. As shown in FIG. 8, the paging message monitoring method is performed by the terminal and also includes the following steps.

At S51, the terminal is determined in an inactive state.

In some examples of the present disclosure, the UE is determined in the RRC_INACTIVE, and the INACTIVE_UE determines the paging message type via an indication message.

FIG. 9 is a flowchart of a paging message monitoring method shown according to an example. As shown in FIG. 9, monitoring the paging message based on the paging message type includes the following steps.

At S61, in response to the paging message type being the first-type paging message or the second-type paging message, it is determined to wake up at the PO and receive the paging message.

In the example of the present disclosure, as in the above example, the first-type paging message includes at least one paging message type, and the at least one paging message type at least includes the CN paging message type and/or the paging short message type. The second-type paging message includes a paging message type, and the paging message type is the RAN paging message type. The INACTIVE_UE determines, in response to the paging message type being the first-type paging message and/or the second-type paging message, to wake up at the PO and receive the paging message.

FIG. 10 is a flowchart of a paging message monitoring method shown according to an example. As shown in FIG. 10, determining the paging message type further includes the following steps.

At S71, the paging message type is determined based on PEI information.

In some examples of the present disclosure, the UE may determine the paging type according to the PEI information.

In an implementation, the UE may also determine the paging type based on a WUS.

FIG. 11 is a schematic diagram of a paging message monitoring method shown according to an example. As shown in FIG. 11, the paging message type is determined based on the PEI. Herein, the IDLE_UE is UE1, and the INACTIVE_UE is UE2. It is determined that the paging message type is the second paging message type, the UE1 determines to enter the sleep state, and the UE2 monitors the corresponding PO and receives the paging message at the corresponding PO. Based on an I-RNTI identifier carried in the paging message, the match is successful, and it is determined to access the network.

FIG. 12 is a flowchart of a paging message monitoring method shown according to an example. As shown in FIG. 12, determining the paging message type further includes the following steps.

At S81, based on a first information field included in the PEI information and used to indicate the paging message type, the paging message type is determined.

In the example of the present disclosure, the PEI information includes the first information field. Herein, the first information field is used to indicate the paging message type. In some examples of the present disclosure, the PEI information may also be the WUS.

In the example of the present disclosure, the first information field includes at least one of the following: a bit used to indicate the first-type paging message or the second-type paging message, where for example, the bit is carried in the PEI/WUS, and the paging message type corresponding to the PEI/WUS of the terminal is indicated by means of DCI; an encoding sequence used to indicate the first-type paging message or the second-type paging message, where for example, encoding sequences of different types are configured for the PEI/WUS, and the paging message type corresponding to the PEI/WUS is indicated based on the encoding sequence such as Sequence; a frequency domain resource used to indicate the first-type paging message or the second-type paging message, where for example, frequency domain resources of different types are configured for the PEI/WUS, and the paging message type corresponding to the PEI/WUS is indicated based on the frequency domain resources of different types such as COREST; a time domain resource used to indicate the first-type paging message or the second-type paging message, where for example, time domain resources of different types are configured for the PEI/WUS, and the paging message type corresponding to the PEI/WUS is indicated based on the time domain resources of different types such as a Search space; or a reference signal used to indicate the first-type paging message or the second-type paging message, where for example, different reference signals such as a Tracking Reference Signal (TRS)/Demodulation Reference Signal (DMRS) are configured for the PEI/WUS, and the paging message type corresponding to the PEI/WUS is indicated based on the different reference signals.

In the example of the present disclosure, before the UE monitors the PEI/WUS, the network side device may instruct the terminal based on radio control RRC signaling to determine whether to include the PEI/WUS indicating the paging message type. For not using the PEI/WUS configured to indicate the paging message type, UEs in all states (including the IDLE_UE and/or the INACTIVE_UE) are determined to monitor the paging message based on the PEI/WUS indicated by the network. For example, the network side informs the terminal whether to use the PEI/WUS configured to indicate the paging message type after entering the IDLE/INACTIVE state via an RRC early data transmission message (RRC_EarlyDataComplete) or an RRC release message (RRC_Release).

In some examples of the present disclosure, as described above, the PEI information includes the first information field. It is determined that the first information field used to indicate the first-type paging message or the second-type paging message is the bit. In other words, the paging message type is indicated in an explicit manner.

In the example of the present disclosure, a bit may be added to the PEI information. It is determined to indicate the paging message type based on the bit. For example, "0" is used to indicate the first-type paging message, and "1" is the second-type indication message. It should be understood that the PEI message also includes the bit used to indicate whether there is the paging message. Herein, "1" may be used to indicate that there is the paging message, and "0" may be used to indicate that there is no paging message. Therefore, "11" represents that there is the paging message, and the paging message type is the second-type paging message. "10" represents that there is the paging message, and the paging message type is the first-type paging message. "01" or "00" represents that there is no paging message. In response to the first bit being "0", it is determined not to judge a second bit. In other words, a bit indication is added to the PEI/WUS, where the first bit is "1", which represents that there is any kind of paging message transmission, while the first bit is "0", which represents that there is no paging message transmission. The second bit indicates "1", which represents that there is the RAN side paging message ("11", i.e., the second-type paging message), while the second bit indicates "0", which represents others ("10", i.e., the first-type paging message). If the first bit is "0", there is no need to judge the second bit (e.g., "0" or "00").

In an implementation, it is determined that the PEI at the current occasion carries the first bit and the second bit as "11", and the IDLE_UE does not need to monitor the PO and enters the sleep state. The INACTIVE_UE monitors the PO and receives the paging message at the corresponding PO.

In an implementation, it is determined that the PEI at the current occasion carries the first bit and the second bit as "10", and the IDLE_UE monitors the PO and receives the paging message at the corresponding PO. The INACTIVE_UE monitors the PO and receives the paging message at the corresponding PO.

In an implementation, if it is determined that the PEI at the current occasion carries the first bit and the second bit as "00" or "01", it may be further determined that there is no paging message, and the IDLE_UE and/or INACTIVE_UE does not monitor the corresponding PO.

For example, if the PEI at the current occasion carries the paging message transmission with bit "11", for the IDLE_UE, it means that there is no corresponding paging message, and there is no need to receive the paging message at the corresponding PO, and for the INACTIVE_UE, the paging message is received at the corresponding PO.

If the PEI at the current occasion carries the paging message transmission with bit "10", for the IDLE and INACTIVE UEs, it is considered that there may be the paging message transmission, and the paging message is received at the corresponding PO.

If the PEI issued at the current occasion carries the bit being "0" or "00", for the IDLE and INACTIVE UEs, it is considered that there is no paging message transmission, and there is no need to monitor the corresponding PO.

In the example of the present disclosure, in response to not using the PEI carrying indicating the paging message type, the IDLE_UE and/or INACTIVE_UE determines the first bit according to the PEI indicated by the network, and determines whether to monitor the corresponding PO based on the first bit. That is, if the network instructs the UE not to use the PEI indicating the paging message type, the UEs in all states receive the first bit information in the PEI. For example, the first bit is "1", which represents that there is any kind of paging message transmission, while the first bit is "0", which represents that there is no paging message transmission.

Certainly, in the example of the present disclosure, "1" may also be used to indicate the first-type paging message, and "0" is the second-type indication message. The above example merely illustrates that the first information field used to indicate the first-type paging message or the second-type paging message is the bit, and does not specifically limit the present disclosure.

In some examples of the present disclosure, as described above, the PEI information includes the first information field. It is determined that the first information field used to indicate the first-type paging message or the second-type paging message is a different encoding sequence. For example, for the first-type paging message and the second-type paging message, as well as no paging message, three different encoding sequence formats are designed, or no encoding sequence format is transmitted when there is no paging message, to respectively represent three PEIs indicating the paging message type.

In the example of the present disclosure, different encoding sequence formats may be configured for the PEI information, and the paging message type is indicated based on the different encoding sequence formats in the PEI information. For example, the encoding sequence format 1 is configured for the PEI information, including the first-type paging message; the encoding sequence format 2 is configured for the PEI information, including the second-type paging message; and the encoding sequence format 3 is configured for the PEI information without the paging message.

In an implementation, it is determined that the PEI that exists at the current occasion is configured with the encoding sequence format 1; it may be determined that the paging message type included in the PEI is the first-type paging message, and the IDLE_UE monitors the PO and receives the paging message at the corresponding PO. The INAC-TIVE_UE monitors the PO and receives the paging message at the corresponding PO.

In an implementation, it is determined that the PEI that exists at the current occasion is configured with the encoding sequence format 2; it may be determined that the paging message type included in the PEI is the second-type paging message, and the IDLE_UE does not need to monitor the PO and enters the sleep state. The INACTIVE_UE monitors the PO and receives the paging message at the corresponding PO.

In an implementation, it is determined that the PEI that exists at the current occasion is configured with the encoding sequence format 3, and it may be determined that there is no paging message in the PEI. The IDLE_UE and/or INAC-TIVE_UE does not monitor the corresponding PO.

For example, if there is the paging message (i.e., the first-type paging message) transmission with the PEI encoding sequence being format 1 at the current occasion, for the IDLE and INACTIVE UEs, it is considered that there may be the paging message transmission thereof, and the paging message is received at the corresponding PO.

If there is the paging message (i.e., the second-type paging message) transmission with the PEI encoding sequence being format 2 at the current occasion, for the IDLE_UE, it means that there is no corresponding paging message, and there is no need to receive the paging message at the corresponding PO, and for the INACTIVE_UE, the paging message is received at the corresponding PO.

If there is the paging message transmission with the PEI encoding sequence being format 3 at the current occasion or no sequence transmission (i.e., no paging message), for both the IDLE and INACTIVE UEs, it is considered that there is no paging message transmission, and there is no need to monitor the corresponding PO.

In the example of the present disclosure, in response to not using the PEI carrying indicating the paging message type, the IDLE_UE and/or INACTIVE_UE determines to monitor the paging message according to the PEI indicated by the network based on the encoding sequence format corresponding to the PEI. For example, the encoding sequence format 1 may be configured for the PEI, indicating that there is any paging message; and the encoding sequence format 2 may be configured for the PEI, indicating that there is no paging message.

In other words, if the network instructs the UE not to use the PEI indicating the paging message type, the UEs in all states receive the PEI sequence format indicated by the network (for example, receiving a general PEI with the encoding sequence format 1 which represents that there is any kind of paging message transmission, and receiving a general PEI with the encoding sequence format 2 or no sequence which represents that there is no paging message transmission).

The encoding sequence is a set of regular information strings, and an encoding sequence format may indicate a paging message type. Different paging message information is represented by transforming different sequence formats.

Certainly, in the example of the present disclosure, the encoding sequence format configured for the PEI is merely an example, and does not specifically limit the present disclosure.

In some examples of the present disclosure, as described above, the PEI information includes the first information field. It is determined that the first information field used to indicate the first-type paging message or the second-type paging message is a different frequency domain resource. The network indicates the corresponding paging message type of the PEI by configuring different frequency resources (e.g., CORESET) for different types of PEIs.

In the example of the present disclosure, different frequency domain resources (e.g., CORESET) may be configured for the PEI information to indicate the paging message type. For example, the frequency domain resource corresponding to the PEI information is divided into two subsets, where the first frequency domain resource subset is used to indicate the first-type paging message, and the second frequency domain resource subset is used to indicate the second-type paging message. In other words, for the first-type paging message and the second-type paging message, the frequency domain resource of the PEI is divided into two subsets (sub-CORESET), where the first frequency domain resource subset is used for first-type paging message transmission, and the second frequency domain resource subset is used for second-type paging message transmission.

In an implementation, the IDLE_UE monitors the first frequency domain resource subset.

In an implementation, the INACTIVE_UE monitors the first frequency domain resource subset and/or the second frequency domain resource subset.

For example, the UE determines its own RRC state and takes the following operations.

The UE determines that its own RRC state is INACTIVE, and the INACTIVE UE monitors both the subsets. If the PEI information is received in any of the frequency domain resource subsets, monitoring is performed at the corresponding PO; otherwise, monitoring is not performed.

The UE determines that its own RRC state is IDLE, and the IDLE UE monitors the first frequency domain resource subset. If the PEI information is received in the subset, monitoring is performed at the corresponding PO; otherwise, monitoring is not performed.

In the example of the present disclosure, in response to not using the PEI carrying indicating the paging message type, it is determined to monitor the paging message based on a frequency domain resource different from the first frequency domain resource subset and the second frequency domain resource subset. Further, if the network instructs the UE not to use the PEI, indicating the paging message type, the UEs in all states perform PEI monitoring on the frequency domain resource of the general PEI. It should be understood that the general PEI and the PEI frequency domain resource indicating the paging message type cannot conflict; that is, the two use different frequency domain resources.

Certainly, the present disclosure is merely illustrative based on the frequency domain resource, and the present disclosure is not specifically limited thereto. In the example of the present disclosure, the paging message type may also be determined based on the time domain resource.

In the example of the present disclosure, a reference signal associated with the PEI WUS may also be used to indicate different paging message types. The present disclosure is not illustrated here.

Based on the same/similar concept, the example of the present disclosure also provides a paging message monitoring method.

FIG. 13 is a flowchart of a paging message monitoring method shown according to an example. As shown in FIG. 13, the paging message monitoring method is performed by the network device and includes the following steps.

At S91, a paging message type is determined.

In the example of the present disclosure, the paging message type includes at least one of a CN paging message type, a RAN paging message type, or a paging short message type.

In the example of the present disclosure, the first-type paging message includes at least one paging message type, and the at least one paging message type at least includes the CN paging message type and/or the paging short message type. An IDLE_UE determines, in response to the paging message type being the first-type paging message, to wake up at a PO and receive the paging message.

In the example of the present disclosure, the first-type paging message may include one of the following cases: the CN paging message type; the paging short message type; the CN paging message type and the RAN paging message type; the CN paging message type and the paging short message type; the paging short message type and the RAN paging message type; or the CN paging message type, the RAN paging message type and the paging short message type.

In an implementation, the first-type paging message may also be referred to as a paging information type for the IDLE_UE and/or the INACTIVE_UE.

Herein, the second-type paging message includes a paging message type, and the paging message type is the RAN paging message. The IDLE_UE determines, in response to the paging message type being the second-type paging message, to enter a sleep state at the PO.

FIG. 14 is a flowchart of a paging message monitoring method shown according to an example. As shown in FIG. 14, determining the paging message type further includes the following steps.

At S101, the paging message type is determined based on PEI information.

In some examples of the present disclosure, the UE may determine the paging type according to the PEI information.

In an implementation, the UE may also determine the paging type based on a WUS.

FIG. 15 is a flowchart of a paging message monitoring method shown according to an example. As shown in FIG. 15, determining the paging message type further includes the following steps.

At S111, based on a first information field included in the PEI information and used to indicate the paging message type, the paging message type is determined.

In the example of the present disclosure, the PEI information includes the first information field. Herein, the first information field is used to indicate the paging message type. In some examples of the present disclosure, the PEI information may also be the WUS.

In the example of the present disclosure, the first information field includes at least one the following: a bit used to indicate the first-type paging message or the second-type paging message, where for example, the bit is carried in the PEI/WUS, and the paging message type corresponding to the PEI/WUS of the terminal is indicated by means of DCI; an encoding sequence used to indicate the first-type paging message or the second-type paging message, where for example, encoding sequences of different types are configured for the PEI/WUS, and the paging message type corresponding to the PEI/WUS is indicated based on the encoding sequence such as Sequence; a frequency domain resource used to indicate the first-type paging message or the second-type paging message, where for example, frequency domain resources of different types are configured for the PEI/WUS, and the paging message type corresponding to the PEI/WUS is indicated based on the frequency domain resources of different types such as COREST; a time domain resource used to indicate the first-type paging message or the second-type paging message, where for example, time domain resources of different types are configured for the PEI/WUS, and the paging message type corresponding to the PEI/WUS is indicated based on the time domain resources of different types such as a Search space; or a reference signal used to indicate the first-type paging message or the second-type paging message, where for example, different reference signals such as a Tracking Reference Signal (TRS)/Demodulation Reference Signal (DMRS) are configured for the PEI/WUS, and the paging message type corresponding to the PEI/WUS is indicated based on the different reference signals.

In the example of the present disclosure, before the UE monitors the PEI WUS, the network-side device may instruct the terminal based on radio control RRC signaling to determine whether to include the PEI/WUS indicating the paging message type. For not using the PEI/WUS, configured to indicate the paging message type, UEs in all states (including the IDLE_UE and/or the INACTIVE_UE) are determined, and the paging message is monitored based on the PEI/WUS indicated by the network. For example, the network side informs the terminal whether to use the PEI/WUS, configured to indicate the paging message type after entering the IDLE/INACTIVE state via an RRC early data transmission message (RRC_EarlyDataComplete) or an RRC release message (RRC_Release).

In some examples of the present disclosure, as described above, the PEI information includes the first information field. It is determined that the first information field used to indicate the first-type paging message or the second-type paging message is the bit. In other words, the paging message type is indicated in an explicit manner.

In the example of the present disclosure, a bit may be added to the PEI information. It is determined to indicate the paging message type based on the bit. For example, "0" is used to indicate the first-type paging message, and "1" is the second-type indication message. It should be understood that the PEI message also includes the bit used to indicate whether there is the paging message. Herein, "1" may be used to indicate that there is the paging message, and "0" may be used to indicate that there is no paging message. Therefore, "11" represents that there is the paging message, and the paging message type is the second-type paging message. "10" represents that there is the paging message, and the paging message type is the first-type paging message. "01" or "00" represents that there is no paging message. In response to the first bit being "0", it is determined not to judge a second bit. In other words, a bit indication is added to the PEI/WUS, where the first bit is "1", which represents that there is any kind of paging message transmission, and the first bit is "0", which represents that there is no paging message transmission. The second bit indicates "1", which represents that there is the RAN side paging message ("11", i.e., the second-type paging message), and indicates "0", which represents others ("10", i.e., the first-type paging message). If the first bit is "0", there is no need to judge the second bit (e.g., "0" or "00").

In an implementation, it is determined that the PEI at the current occasion carries the first bit and the second bit as "11", and the IDLE_UE does not need to monitor the PO and enters the sleep state. The INACTIVE_UE monitors the PO and receives the paging message at the corresponding PO.

In an implementation, it is determined that the PEI at the current occasion carries the first bit and the second bit as "10", and the IDLE_UE monitors the PO and receives the paging message at the corresponding PO. The INAC-TIVE_UE monitors the PO and receives the paging message at the corresponding PO.

In an implementation, if it is determined that the PEI at the current occasion carries the first bit and the second bit as "00" or "01", it may be further determined that there is no paging message, and the IDLE_UE and/or INACTIVE_UE does not monitor the corresponding PO.

For example, if the PEI at the current occasion carries the paging message transmission with the bit "11", for the IDLE_UE, it means that there is no corresponding paging message, and there is no need to receive the paging message at the corresponding PO, and for the INACTIVE_UE, the paging message is received at the corresponding PO.

If the PEI at the current occasion carries the paging message transmission with bit "10", for the IDLE and INACTIVE UEs, it is considered that there may be the paging message transmission, and the paging message is received at the corresponding PO.

If the PEI issued at the current occasion carries the bit being "0" or "00", for the IDLE and INACTIVE UEs, it is considered that there is no paging message transmission, and there is no need to monitor the corresponding PO.

In the example of the present disclosure, in response to not using the PEI carrying indicating the paging message type, the IDLE_UE and/or INACTIVE_UE determines the first bit according to the PEI indicated by the network, and determines whether to monitor the corresponding PO based on the first bit. That is, if the network instructs the UE not to use the PEI indicating the paging message type, the UEs in all states receive the first bit information in the PEI. For example, the first bit is "1", which represents that there is any kind of paging message transmission, while the first bit is "0", which represents that there is no paging message transmission.

Certainly, in the example of the present disclosure, "1" may also be used to indicate the first-type paging message, and "0" is the second-type indication message. The above example merely illustrates that the first information field used to indicate the first-type paging message or the second-type paging message is the bit, and does not specifically limit the present disclosure.

In some examples of the present disclosure, as described above, the PEI information includes the first information field. It is determined that the first information field used to indicate the first-type paging message or the second-type paging message is a different encoding sequence. For example, for the first-type paging message and the second-type paging message as well as no paging message, three different encoding sequence formats are designed, or no encoding sequence format is transmitted when there is no paging message, to respectively represent three PEIs indicating the paging message type.

In the example of the present disclosure, different encoding sequence formats may be configured for the PEI information, and the paging message type is indicated based on the different encoding sequence formats in the PEI information. For example, the encoding sequence format 1 is configured for the PEI information, including the first-type paging message; the encoding sequence format 2 is configured for the PEI information, including the second-type paging message; and the encoding sequence format 3 is configured for the PEI information without the paging message.

In an implementation, it is determined that the PEI that exists at the current occasion is configured with the encoding sequence format 1; it may be determined that the paging message type included in the PEI is the first-type paging message, and the IDLE_UE monitors the PO and receives the paging message at the corresponding PO. The INAC-TIVE_UE monitors the PO and receives the paging message at the corresponding PO.

In an implementation, it is determined that the PEI that exists at the current occasion is configured with the encoding sequence format 2; it may be determined that the paging message type included in the PEI is the second-type paging message, and the IDLE_UE does not need to monitor the PO and enters the sleep state. The INACTIVE_UE monitors the PO and receives the paging message at the corresponding PO.

In an implementation, it is determined that the PEI that exists at the current occasion is configured with the encoding sequence format 3, and it may be determined that there is no paging message in the PEI. The IDLE_UE and/or INAC-TIVE_UE does not monitor the corresponding PO.

For example, if there is the paging message (i.e., the first-type paging message) transmission with the PEI encoding sequence being format 1 at the current occasion, for the IDLE and INACTIVE UEs, it is considered that there may be the paging message transmission thereof, and the paging message is received at the corresponding PO.

If there is the paging message (i.e., the second-type paging message) transmission with the PEI encoding sequence being format 2 at the current occasion, for the IDLE_UE, it means that there is no corresponding paging message, and there is no need to receive the paging message at the corresponding PO, and for the INACTIVE_UE, the paging message is received at the corresponding PO.

If there is the paging message transmission with the PEI encoding sequence being format 3 at the current occasion or no sequence transmission (i.e., no paging message), for both the IDLE and INACTIVE UEs, it is considered that there is no paging message transmission, and there is no need to monitor the corresponding PO.

In the example of the present disclosure, in response to not using the PEI carrying indicating the paging message type, the IDLE_UE and/or INACTIVE_UE determines to monitor the paging message according to the PEI indicated by the network based on the encoding sequence format corresponding to the PEI. For example, the encoding sequence format 1 may be configured for the PEI, indicating that there is any paging message; and the encoding sequence format 2 may be configured for the PEI, indicating that there is no paging message.

In other words, if the network instructs the UE not to use the PEI indicating the paging message type, the UEs in all states receive the PEI sequence format indicated by the network (for example, receiving a general PEI with the encoding sequence format 1 which represents that there is any kind of paging message transmission, and receiving a general PEI with the encoding sequence format 2 or no sequence which represents that there is no paging message transmission).

The encoding sequence is a set of regular information strings, and an encoding sequence format may indicate a paging message type. Different paging message information is represented by transforming different sequence formats.

Certainly, in the example of the present disclosure, the encoding sequence format configured for the PEI is merely an example, and does not specifically limit the present disclosure.

In some examples of the present disclosure, as described above, the PEI information includes the first information field. It is determined that the first information field used to indicate the first-type paging message or the second-type paging message is a different frequency domain resource. The network indicates the corresponding paging message type of the PEI by configuring different frequency resources (e.g., CORESET) for different types of PEIs.

In the example of the present disclosure, different frequency domain resources (e.g., CORESET) may be configured for the PEI information to indicate the paging message type. For example, the frequency domain resource corresponding to the PEI information is divided into two subsets, where the first frequency domain resource subset is used to indicate the first-type paging message, and the second frequency domain resource subset is used to indicate the second-type paging message. In other words, for the first-type paging message and the second-type paging message, the frequency domain resource of the PEI is divided into two subsets (sub-CORESET), where the first frequency domain resource subset is used for first-type paging message transmission, and the second frequency domain resource subset is used for second-type paging message transmission.

In an implementation, the IDLE_UE monitors the first frequency domain resource subset.

In an implementation, the INACTIVE_UE monitors the first frequency domain resource subset and/or the second frequency domain resource subset.

For example, the UE determines its own RRC state and takes the following operations.

The UE determines that its own RRC state is INACTIVE, and the INACTIVE UE monitors both the subsets. If the PEI information is received in any of the frequency domain resource subsets, monitoring is performed at the corresponding PO, otherwise, monitoring is not performed.

The UE determines that its own RRC state is IDLE, and the IDLE UE monitors the first frequency domain resource subset. If the PEI information is received in the subset, monitoring is performed at the corresponding PO; otherwise, monitoring is not performed.

In the example of the present disclosure, in response to not using the PEI carrying indicating the paging message type, it is determined to monitor the paging message based on a frequency domain resource different from the first frequency domain resource subset and the second frequency domain resource subset. Further, if the network instructs the UE not to use the PEI, indicating the paging message type, the UEs in all states perform PEI monitoring on the frequency domain resource of the general PEI. It should be understood that the general PEI and the PEI frequency domain resource indicating the paging message type cannot conflict; in other words, the two use different frequency domain resources.

Certainly, the present disclosure is merely illustrative based on the frequency domain resource, and the present disclosure is not specifically limited thereto. In the example of the present disclosure, the paging message type may also be determined based on the time domain resource.

In the example of the present disclosure, a reference signal associated with the PEI WUS may also be used to indicate different paging message types. The present disclosure is not illustrated here.

Based on the same idea, examples of the present disclosure further provide a paging message monitoring apparatus.

It can be understood that the paging message monitoring apparatus provided by examples of the present disclosure contains corresponding hardware structures and/or software modules that perform respective functions to achieve the functions. In combination with units and algorithmic steps of each example disclosed in examples of the present disclosure, examples of the present disclosure can be implemented in the form of hardware or a combination of hardware and computer software. Whether a function is implemented based on hardware or computer software driving hardware depends on specific applications and design constraints of the technical solution. A person skilled in the art may use a different method for each particular application to achieve the functions, but such implementation shall not be considered outside the scope of the technical solution of the examples of the disclosure.

FIG. 16 is a block diagram of a paging message monitoring apparatus shown according to an example. Referring to FIG. 16, the paging message monitoring apparatus 100 is performed by a terminal. The paging message monitoring apparatus includes: a determining module 101 and a monitoring module 102.

The determining module 101 is used to determine a paging message type. The paging message type includes at least one of a CN paging message type, a RAN paging message type, or a paging short message type. The monitoring module 102 is used to monitor a paging message based at least on the paging message type.

In the example of the present disclosure, the determining module 101 is further used to determine the terminal in an idle state.

In the example of the present disclosure, the monitoring module 102 is used to respond to the paging message type being a first-type paging message, the first-type paging message including at least one paging message type, and the at least one paging message type including at least one of the CN paging message type or the paging short message type; and to determine to wake up at a PO and receive the paging message.

In the example of the present disclosure, the monitoring module 102 is used to respond to the paging message type being a second-type paging message, the second-type paging message including a paging message type, and the paging message type being the RAN paging message type; and to determine to enter a sleep state at the PO.

In the example of the present disclosure, the determining module 101 is further used to determine the terminal in an inactive state.

In the example of the present disclosure, the monitoring module 102 is used to respond to the paging message type being the first-type paging message or the second-type paging message, the first-type paging message including at least one paging message type, the at least one paging message type including at least one of the CN paging message type or the paging short message type, the second-type paging message including a paging message type, and the paging message type being the RAN paging message type; and to determine to wake up at the PO and receive the paging message.

In the example of the present disclosure, the determining module 101 is used to determine the paging message type based on PEI information.

In the example of the present disclosure, the PEI information includes a first information field, and the first information field is used to indicate the paging message type.

In the example of the present disclosure, the first information field includes at least one of the following: a bit used to indicate a first-type paging message or a second-type paging message; an encoding sequence used to indicate the first-type paging message or the second-type paging message; a frequency domain resource used to indicate the first-type paging message or the second-type paging message; a time domain resource used to indicate the first-type paging message or the second-type paging message; or a reference signal used to indicate the first-type paging message or the second-type paging message.

FIG. 17 is a block diagram of a paging message monitoring apparatus shown according to an example. Referring to FIG. 17, the paging message monitoring apparatus 200 is performed by the network device. The paging message monitoring apparatus includes: a determining module 201.

The determining module 201 is used to determine a paging message type. The paging message type includes at least one of a CN paging message type, a RAN paging message type, or a paging short message type.

In the example of the present disclosure, the determining module 201 is used to determine the paging message type based on PEI information.

In the example of the present disclosure, the PEI information includes a first information field, and the first information field is used to indicate the paging message type.

In the example of the present disclosure, the first information field includes at least one of the following: a bit used to indicate a first-type paging message or a second-type paging message; an encoding sequence used to indicate the first-type paging message or the second-type paging message; a frequency domain resource used to indicate the first-type paging message or the second-type paging message; a time domain resource used to indicate the first-type paging message or the second-type paging message; or a reference signal used to indicate the first-type paging message or the second-type paging message.

With regard to the apparatus in the above examples, the specific manners in which various modules perform operations have been described in detail in the examples relating to the method, and therefore, further details are not described herein.

Figure 18:
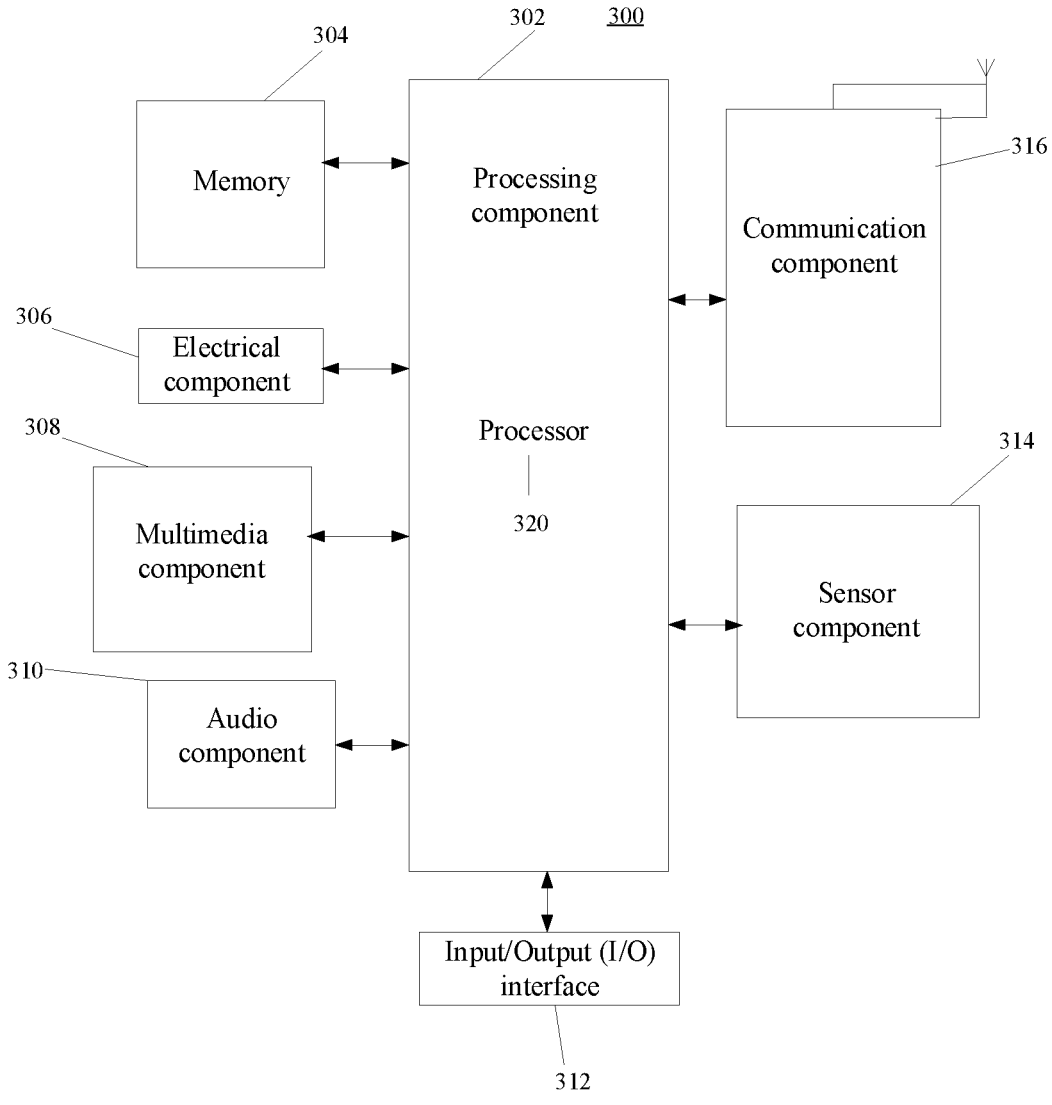
FIG. 18 is a block diagram of an apparatus for paging message monitoring, shown according to an example.

FIG. 18 is a block diagram of an apparatus 300 for paging message monitoring according to an example. For example, the apparatus 300 may be a mobile phone, a computer, a digital broadcasting terminal, a messaging device, a game console, a tablet device, a medical device, a fitness device, a personal digital assistant, etc.

Referring to FIG. 18, the apparatus 300 may include one or more of the following components: a processing component 302, a memory 304, an electrical component 306, a multimedia component 308, an audio component 310, an input/output (I/O) interface 312, a sensor component 314, and a communication component 316.

The processing component 302 usually controls the overall operations of the apparatus 300, such as operations associated with display, telephone call, data communication, camera operation, and recording operation. The processing component 302 may include one or more processors 320 to execute instructions to complete all or part of the steps of the above method. In addition, the processing component 302 may include one or more modules to facilitate the interaction between the processing component 302 and other components. For example, the processing component 302 may include a multimedia module to facilitate the interaction between the multimedia component 308 and the processing component 302.

The memory 304 is configured to store various types of data to support operations at the apparatus 300. Examples of these data include instructions for any application or method operated on the apparatus 300, contact data, phone book data, messages, pictures, videos, etc. The memory 304 may be realized by any type of volatile or non-volatile storage equipment or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The electrical component 306 supplies power to various components of the apparatus 300. The electrical component 306 may include a power management system, one or more power sources, and other components associated with power generation, management, and distribution of the apparatus 300.

The multimedia component 308 includes a screen for providing an output interface between the apparatus 300 and the user. In some examples, the screen may include a liquid crystal display (LCD) and a touch panel (TP). If the screen includes the TP, the screen may be implemented as a touch screen to receive input signals from the user. The TP includes one or more touch sensors to sense touches, slides, and gestures on the touch panel. The touch sensor may sense not only the boundary of the touch or slide, but also the duration and pressure associated with the touch or slide. In some examples, the multimedia component 308 includes a front camera and/or a rear camera. When the apparatus 300 is in an operation mode, such as a shooting mode or a video mode, the front camera and/or the rear camera can receive external multimedia data. Each front or rear camera may be a fixed optical lens system or have a focal length and optical zoom capability.

The audio component 310 is configured to output and/or input an audio signal. For example, the audio component 310 includes a microphone (MIC), and when the apparatus 300 is in an operation mode, such as a call mode, a recording mode, or a voice recognition mode, the microphone is configured to receive external audio signals. The received audio signals may be further stored in the memory 304 or sent by the communication component 316. In some examples, the audio component 310 further includes a speaker for outputting audio signals.

The I/O interface 312 provides an interface between processing component 302 and a peripheral interface module. The peripheral interface module may be a keyboard, a click wheel, buttons, etc. These buttons may include, but are not limited to, a home button, a volume button, a start button, and a lock button.

The sensor component 314 includes one or more sensors for providing various aspects of status assessment for the apparatus 300. For example, the sensor component 314 may detect the on/off state of the apparatus 300, and the relative positions of components, such as a display and a keypad of the apparatus 300. The sensor component 314 may further detect a position change of the apparatus 300 or one component of the apparatus 300, the presence or absence of contact between the user and the apparatus 300, an orientation or acceleration/deceleration of the apparatus 300, and a temperature change of the apparatus 300. The sensor component 314 may include a proximity sensor configured to detect the presence of nearby objects without any physical contact. The sensor component 314 may further include an optical sensor, such as a CMOS or CCD image sensor, for use in imaging applications. In some examples, the sensor component 314 may further include an acceleration sensor, a gyroscope sensor, a magnetic sensor, a pressure sensor, or a temperature sensor.

The communication component 316 is configured to facilitate wired or wireless communication between the apparatus 300 and other devices. The apparatus 300 may access a wireless network based on communication standards, such as WiFi, 2G, 3G, or a combination thereof. In an example, the communication component 316 receives broadcast signals or broadcast-related information from an external broadcast management system through a broadcast channel. In an example, the communication component 316 further includes a Near Field Communication (NFC) module to facilitate short-range communication. For example, the NFC module may be implemented based on Radio Frequency Identification (RFID) technology, Infrared Data Association (IrDA) technology, Ultra-wideband (UWB) technology, Bluetooth (BT) technology, and other technologies.

In an example, the apparatus 300 may implement the above method by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements.

In an example, a non-transitory computer-readable storage medium including an instruction is further provided, such as a memory 304 including an instruction executable by the processor 320 of the apparatus 300 to complete the above method. For example, the non-transitory computer-readable storage medium may be a ROM, a Random Access Memory (RAM), a CD-ROM, a magnetic tape, a floppy disk, an optical data storage device, etc.

Figure 19:
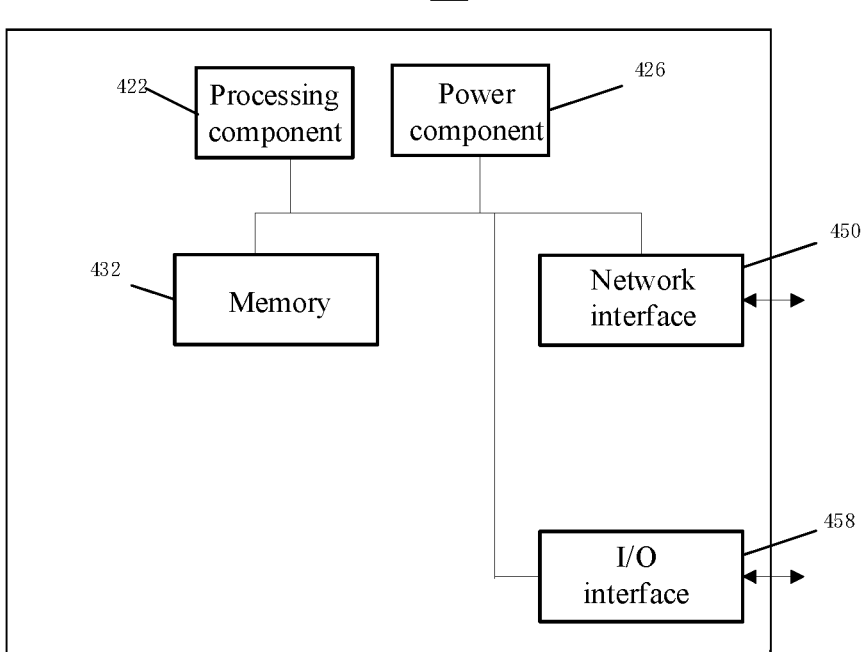
FIG. 19 is a block diagram of another apparatus for paging message monitoring, shown according to an example.

FIG. 19 is a block diagram of an apparatus 400 for paging message monitoring, shown according to an example. For example, the apparatus 400 may be provided as a server. Referring to FIG. 19, the apparatus 400 includes a processing component 422, and further includes one or more processors, and a memory resource represented by the memory 432 and used for storing an instruction capable of being executed by the processing component 422, such as an application program. The application stored in the memory 432 may include one or more modules, each corresponding to a set of instructions. In addition, the processing component 422 is configured to execute the instruction to perform the above paging message monitoring method.

The apparatus 400 may further include a power component 426 configured to execute power supply management on the apparatus 400, a wired or wireless network interface 450 configured to connect the apparatus 400 to a network, and an I/O interface 458. The apparatus 400 can operate an operating system stored in the memory 432, such as Windows Server™, Mac OS XTM, Unix™, Linux™, FreeBSD™, or the like.

It can be further understood that "multiple" in the present disclosure refers to two or more than two, and other quantifiers are similar. "And/or," which describes the association relationship of associated objects, indicates that three relationships can exist, for example, A and/or B, which can indicate the following three cases: A alone, both A and B, and B alone. The character "/" generally indicates an "or" relationship between former and later associated objects. Singular forms "a," "said," and "the" are also intended to include most forms, unless the context clearly indicates otherwise.

It is further understood that terms "first," "second," etc., are used to describe a variety of information, but such information should not be limited to these terms. These terms are used only to distinguish the same type of information from one another and do not indicate a particular order or level of importance. In fact, the expressions "first" and "second" can be used interchangeably. For example, without departing from the scope of the disclosure, the first information may also be referred to as second information, and similarly, the second information may also be referred to as first information.

It may further be understood that, in the examples of the present disclosure, although the operations are described in a particular order in the figures, it should not be understood as requiring that these operations are executed in the particular order shown or in a serial order, or requiring that all the operations shown are executed to obtain desired results. In a specific environment, multitasking and parallel processing may be advantageous.

According to a first aspect of examples of the present disclosure, a paging message monitoring method is provided. The method is performed by a terminal and includes: determining a paging message type, the paging message type including at least one of a CN paging message type, a RAN paging message type, or a paging short message type; and monitoring a paging message based on the paging message type.

In an implementation, before the step of determining the paging message type, the method further includes: determining the terminal in an idle state.

In an implementation, the step of monitoring the paging message based on the paging message type includes: in response to the paging message type being a first-type paging message, the first-type paging message including at least one paging message type, and the at least one of paging message type including at least one of the CN paging message type or the paging short message type, and determining to wake up at a PO and receive the paging message.

In an implementation, the step of monitoring the paging message based on the paging message type includes: in response to the paging message type being a second-type paging message, the second-type paging message at least including a paging message type, and the paging message type being the RAN paging message type, determining to enter a sleep state at the PO.

In an implementation, before the step of determining the paging message type, the method further includes: determining the terminal in an inactive state.

In an implementation, the step of monitoring the paging message based on the paging message type includes: in response to the paging message type being the first-type paging message or the second-type paging message, the first-type paging message including at least one paging message type, the at least one paging message type including at least one of the CN paging message type or the paging short message type, the second-type paging message including a paging message type, and the paging message type being the RAN paging message type, determining to wake up at the PO and receive the paging message.

In an implementation, determining the paging message type includes determining the paging message type based on Paging Early Indication (PEI) information.

In an implementation, the PEI information includes a first information field, and the first information field is used to indicate the paging message type.

In one implementation, the first information field includes at least one of the following: a bit used to indicate the first-type paging message or the second-type paging message; an encoding sequence used to indicate the first-type paging message or the second-type paging message; a frequency domain resource used to indicate the first-type paging message or the second-type paging message; a time domain resource used to indicate the first-type paging message or the second-type paging message; or a reference signal used to indicate the first-type paging message or the second-type paging message.

According to a second aspect of the examples of the present disclosure, a paging message monitoring method is provided. The method is performed by a network device and includes: determining a paging message type, the paging message type including at least one of a CN paging message type, a RAN paging message type, or a paging short message type.

In an implementation, determining the paging message type includes: determining the paging message type based on PEI information.

In an implementation, the PEI information includes a first information field, and the first information field is used to indicate the paging message type.

In one implementation, the first information field includes at least one of the following: a bit used to indicate a first-type paging message or a second-type paging message; an encoding sequence used to indicate the first-type paging message or the second-type paging message; a frequency domain resource used to indicate the first-type paging message or the second-type paging message; a time domain resource used to indicate the first-type paging message or the second-type paging message; or a reference signal used to indicate the first-type paging message or the second-type paging message.

According to a third aspect of the examples of the present disclosure, a paging message monitoring apparatus is provided. The apparatus is performed by a terminal and includes: a determining module, used to determine a paging message type, the paging message type including at least one of a CN paging message type, a RAN paging message type, or a paging short message type; and a monitoring module, used to monitor a paging message based on the paging message type.

In an implementation, the determining module is further used to determine the terminal in an idle state.

In an implementation, the monitoring module is used to determine to wake up at a PO and receive the paging message, in response to the paging message type being a first-type paging message, the first-type paging message including at least one paging message type, and the at least one paging message type including at least one of the CN paging message type or the paging short message type, determine to wake up at a PO and receive the paging message.

In an implementation, the monitoring module is used to, in response to the paging message type being a second-type paging message, the second-type paging message including a paging message type, and the paging message type being the RAN paging message type, determine to enter a sleep state at the PO.

In an implementation, the determining module is further used to determine the terminal in an inactive state.

In an implementation, the monitoring module is used to determine to wake up at the PO and receive the paging message, in response to the paging message type being the first-type paging message or the second-type paging message, the first-type paging message including at least one paging message type, the at least one paging message type including at least one of the CN paging message type or the paging short message type, the second-type paging message including a paging message type, and the paging message type being the RAN paging message type, determine to wake up at the PO and receive the paging message.

In an implementation, the determining module is used to: determine the paging message type based on PEI information.

In an implementation, the PEI information includes a first information field, and the first information field is used to indicate the paging message type.

In one implementation, the first information field includes at least one of the following: a bit used to indicate the first-type paging message or the second-type paging message; an encoding sequence used to indicate the first-type paging message or the second-type paging message; a frequency domain resource used to indicate the first-type paging message or the second-type paging message; a time domain resource used to indicate the first-type paging message or the second-type paging message; or a reference signal used to indicate the first-type paging message or the second-type paging message.

According to a fourth aspect of the examples of the present disclosure, a paging message monitoring apparatus is provided. The apparatus is performed by a network device and includes a determining module, used to determine a paging message type, the paging message type including at least one of a CN paging message type, a RAN paging message type, or a paging short message type.

In an implementation, the determining module is used to determine the paging message type based on PEI information.

In an implementation, the PEI information includes a first information field, and the first information field is used to indicate the paging message type.

In one implementation, the first information field includes at least one of the following: a bit used to indicate a first-type paging message or a second-type paging message; an encoding sequence used to indicate the first-type paging message or the second-type paging message; a frequency domain resource used to indicate the first-type paging message or the second-type paging message; a time domain resource used to indicate the first-type paging message or the second-type paging message; or a reference signal used to indicate the first-type paging message or the second-type paging message.

The technical solutions provided by the examples of the present disclosure may include the following beneficial effects: the terminal may determine the paging message type according to its own state, and monitor the paging message according to the determined paging message type, to prevent an IDLE_User Equipment (UE) from receiving unnecessary RAN side paging, and accordingly achieve the purpose of reducing power consumption.

A person skilled in the art would readily conceive of other examples of the present disclosure after considering the specification and practicing the invention disclosed herein. The present disclosure is intended to cover any variations, uses, or adaptive changes of the present disclosure. These variations, uses, or adaptive changes follow the general principle of the present disclosure and include common general knowledge or conventional technical means in the technical field that are not disclosed in the present disclosure. The specification and examples are considered as exemplary only, and the true scope and spirit of the disclosure is indicated by the following claims.

It should be understood that the present disclosure is not limited to the precise structure described above and shown in the drawings, and various modifications and changes can be made without departing from its scope. The scope of the present disclosure is only limited by the appended claims.

What is claimed is:

1. A paging message monitoring method, performed by a terminal, the method comprising:

determining a paging message type based on Paging Early Indication (PEI) information, wherein the paging message type comprises at least one of a Core Network (CN) paging message type, a Radio Access Network (RAN) paging message type, or a paging short message; and monitoring a paging message based at least on the paging message type.

2. The paging message monitoring method according to claim 1, wherein before determining the paging message type, the method further comprises:

determining the terminal in an idle state.

3. The paging message monitoring method according to claim 1, wherein monitoring the paging message based on the paging message type comprises:

in response to the paging message type being a first-type paging message, wherein the first-type paging message comprises at least one paging message type, and the at least one paging message type comprises at least one of the CN paging message type or the paging short message type, determining to wake up at a Paging Occasion (PO) and receive the paging message.

4. The paging message monitoring method according to claim 1, wherein monitoring the paging message based on the paging message type comprises:

in response to the paging message type being a second-type paging message, wherein the second-type paging message comprises a paging message type, and the paging message type is the RAN paging message type, determining to enter a sleep state at a Paging Occasion (PO).

5. The paging message monitoring method according to claim 1, wherein before determining the paging message type, the method further comprises:

determining the terminal in an inactive state.

6. The paging message monitoring method according to claim 1, wherein monitoring the paging message based on the paging message type comprises:

in response to the paging message type being a first-type paging message or a second-type paging message, wherein the first-type paging message comprises at least one paging message type, the at least one paging message type comprises at least one of the CN paging message type or the paging short message type, the second-type paging message comprises a paging message type, and the paging message type is the RAN paging message type, determining to wake up at a Paging Occasion (PO) and receive the paging message.

7. The paging message monitoring method according to claim 1, wherein the PEI information comprises a first information field, and the first information field is configured to indicate the paging message type.

8. The paging message monitoring method according to claim 7, wherein the first information field comprises at least one of:

a bit configured to indicate a first-type paging message or a second-type paging message;

an encoding sequence configured to indicate the first-type paging message or the second-type paging message;

a frequency domain resource configured to indicate the first-type paging message or the second-type paging message;

a time domain resource configured to indicate the first-type paging message or the second-type paging message; or a reference signal configured to indicate the first-type paging message or the second-type paging message.

9. The paging message monitoring method according to claim 1, wherein the PEI information is determined based on radio control resource signaling.

10. A paging message monitoring method, performed by a network device, the method comprising:

determining a paging message type based on Paging Early Indication (PEI) information, wherein the paging message type comprises at least one of a Core Network (CN) paging message type, a Radio Access Network (RAN) paging message type, or a paging short message type.

11. A non-transitory computer-readable storage medium, having stored thereon computer program instructions, wherein the computer program instructions, when executed by a processor, cause the processor to perform the paging message monitoring method according to claim 1.

12. The paging message monitoring method according to claim 10, wherein the PEI information is determined based on radio control resource signaling.

13. The paging message monitoring method according to claim 10, wherein the PEI information comprises a first information field, and the first information field is configured to indicate the paging message type.

14. The paging message monitoring method according to claim 13, wherein the first information field comprises at least one of:

a bit configured to indicate a first-type paging message or a second-type paging message;

an encoding sequence configured to indicate the first-type paging message or the second-type paging message;

a frequency domain resource configured to indicate the first-type paging message or the second-type paging message;

a time domain resource configured to indicate the first-type paging message or the second-type paging message; or a reference signal configured to indicate the first-type paging message or the second-type paging message.

15. A paging message monitoring apparatus, comprising:

a processor; and a memory for storing a processor-executable instruction, wherein the processor is configured to perform the paging message monitoring method according to claim 10.

16. A non-transitory computer-readable storage medium, having stored thereon computer program instructions, wherein the computer program instructions, when executed by a processor, cause the processor to perform the paging message monitoring method according to claim 10.

17. A paging message monitoring apparatus, comprising:

a processor; and a memory for storing a processor executable instruction, wherein the processor is configured to:

determine a paging message type based on Paging Early Indication (PEI) information, wherein the paging message type comprises at least one of a Core Network (CN) paging message type, a Radio Access Network (RAN) paging message type, or a paging short message; and monitor a paging message based at least on the paging message type.

18. The paging message monitoring apparatus according to claim 17, wherein the processor is further configured to:

determine that a terminal is in an idle state before determining a paging message type.

* * * * *